(12) United States Patent
Nguyen et al.

(10) Patent No.: US 10,198,558 B2
(45) Date of Patent: Feb. 5, 2019

(54) DATA SOURCE SECURITY CLUSTER

(71) Applicant: Red Hat, Inc., Raleigh, NC (US)

(72) Inventors: Filip Nguyen, Brno (CZ); Filip Elias, Vysni Lhoty (CZ)

(73) Assignee: RED HAT, INC., Raleigh, NC (US)

( * ) Notice: Subject to any disclaimer, the term of this patent is extended or adjusted under 35 U.S.C. 154(b) by 834 days.

(21) Appl. No.: 14/507,564

(22) Filed: Oct. 6, 2014

(65) Prior Publication Data

US 2016/0098484 A1    Apr. 7, 2016

(51) Int. Cl.
*G06F 21/00* (2013.01)
*G06F 21/33* (2013.01)
*G06F 21/62* (2013.01)
*H04L 29/06* (2006.01)

(52) U.S. Cl.
CPC .............. *G06F 21/00* (2013.01); *G06F 21/33* (2013.01); *G06F 21/6218* (2013.01); *H04L 63/0807* (2013.01); *G06F 2221/2115* (2013.01)

(58) Field of Classification Search
CPC ...... G06F 21/00; G06F 21/33; G06F 21/6218; G06F 2221/2115; H04L 63/10
USPC ......................................................... 707/770
See application file for complete search history.

(56) References Cited

U.S. PATENT DOCUMENTS

| 8,090,880 | B2* | 1/2012 | Hasha .................. H04L 67/1095 707/627 |
| 8,522,335 | B2 | 8/2013 | Lawrence et al. |
| 8,607,322 | B2 | 12/2013 | Hinton et al. |
| 8,725,770 | B2 | 5/2014 | Koide et al. |
| 2005/0149496 | A1 | 7/2005 | Mukherjee et al. |
| 2007/0038596 | A1* | 2/2007 | Pizzo ................... G06F 21/6227 |
| 2009/0125540 | A1 | 5/2009 | Dettinger et al. |
| 2009/0276840 | A1* | 11/2009 | Cao ........................ H04L 9/3213 726/9 |
| 2010/0070448 | A1* | 3/2010 | Omoigui ............. H01L 27/1463 706/47 |
| 2010/0262717 | A1* | 10/2010 | Critchley ................ H04L 12/42 709/251 |
| 2011/0131643 | A1* | 6/2011 | Lawrence ............. H04L 9/3213 726/10 |

(Continued)

OTHER PUBLICATIONS

Enterprise Information Integration; http://www.attunity.com/sites/default/files/product_resource/Attunity-Federate-Data-Sheet.pdf.

(Continued)

*Primary Examiner* — Hosain T Alam
*Assistant Examiner* — Nicholas E Allen
(74) *Attorney, Agent, or Firm* — Haynes and Boone, LLP

(57) ABSTRACT

Methods, systems, and computer program for implementing data source security cluster are provided. Security tokens may be generated for a plurality of data sources. Clients may request a security token from each data source. The client may send the security tokens and a data query to a federation engine. The federation engine may generate a plurality of sub-queries from the query. The federation engine may match a sub-query and particular security token to a data source. The federation engine may validate each security token and send, to each data source, the matching sub-query for that data source. Each data source may send a result to a sub-query to the federation engine, which may join all of the results into a virtual view.

20 Claims, 4 Drawing Sheets

(56) References Cited

U.S. PATENT DOCUMENTS

| | | | | |
|---|---|---|---|---|
| 2012/0291090 A1* | 11/2012 | Srinivasan | ........... | G06F 21/6236 |
| | | | | 726/1 |
| 2013/0006999 A1* | 1/2013 | Wojtowicz | ......... | G06F 17/30545 |
| | | | | 707/741 |
| 2013/0179677 A1* | 7/2013 | Harada | ................. | G06Q 20/206 |
| | | | | 713/150 |
| 2013/0191650 A1* | 7/2013 | Balakrishnan | ....... | G06F 21/6227 |
| | | | | 713/190 |
| 2013/0191884 A1* | 7/2013 | Leicher | ................... | H04L 63/08 |
| | | | | 726/4 |
| 2014/0089661 A1* | 3/2014 | Mahadik | .............. | H04L 61/1511 |
| | | | | 713/162 |
| 2014/0101679 A1* | 4/2014 | Yin | ..................... | H04N 21/4623 |
| | | | | 725/5 |
| 2014/0115724 A1* | 4/2014 | van Brandenburg | ... | G06F 21/10 |
| | | | | 726/30 |
| 2014/0181013 A1* | 6/2014 | Micucci | ............. | G06F 17/30943 |
| | | | | 707/610 |
| 2014/0250147 A1* | 9/2014 | Shapira | .............. | G06F 17/30864 |
| | | | | 707/770 |

OTHER PUBLICATIONS

Mathew Sam Cherian; A Semantic Data Federation Engine: Design, Implemenation & Applications in Educational Information Management; Feb. 2011; 90 pages; http://dspace. mit.edu/bitstream/handle/1721.1/65501/746740045.pdf? . . . 1.

Data Federation Administration Tool Guide; Mar. 19, 2012; 124 pages; http://help.sap.com/buisnessobject/product_guides/boexir4/en/xi4_dfat_guide_en.pdf.

1 Introduction to Oracle Identity Federation; 17 pages; http://docs.oracle.com/cd/E15523_01/oim.1111/e13400/intro.htm.

* cited by examiner

US 10,198,558 B2

DATA SOURCE SECURITY CLUSTER

BACKGROUND

A federated database system is a type of database management system (DBMS). In a federated database system, a plurality of data sources may be mapped into a single federated database. This federated database may also be known as a virtual database. The federated database presents the data from a plurality of data sources to a client as though the data is located in a single database.

In a federated database system, a query of a plurality of databases may be received at the federated database system. The federated database system decomposes the query into sub-queries that are distributed to a plurality of separate databases. The result of each sub-query may then be aggregated into a single result set by the federated database system. The single result set may be known as a virtual view. The virtual view may be queried by clients to retrieve data from the federated database system.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
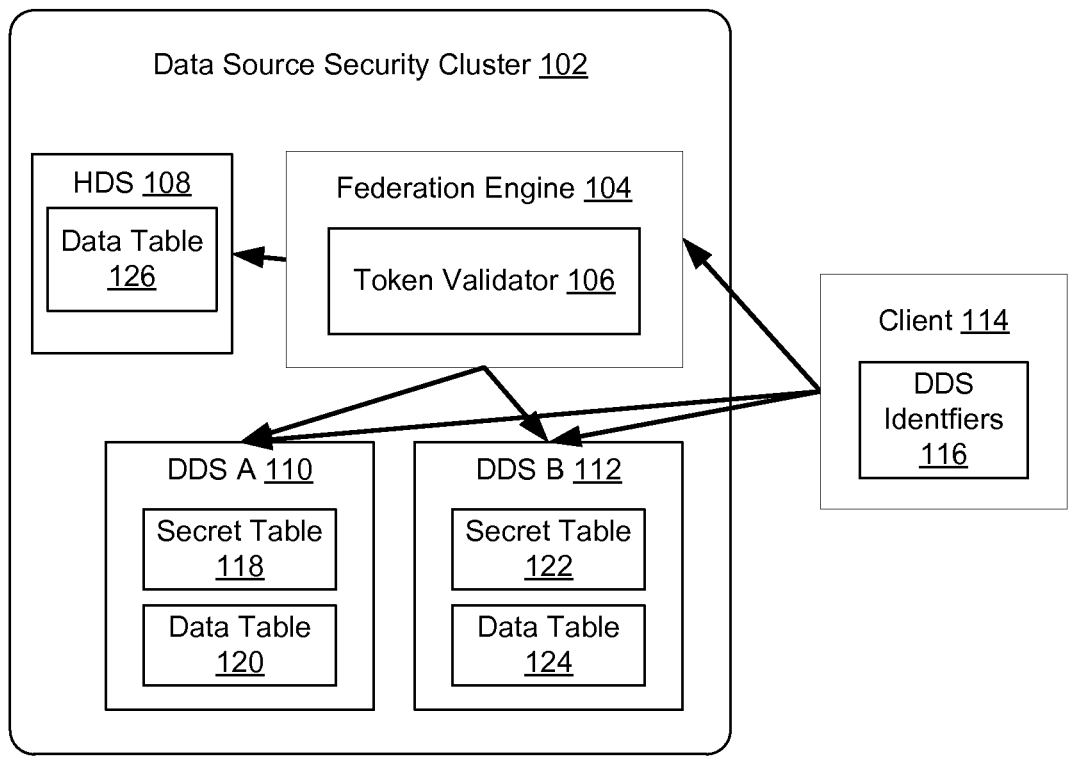
FIG. 1 is a block diagram illustrating a system architecture for a data source security cluster, in accordance with various examples of the present disclosure.

FIG. 1 illustrates an exemplary system architecture 100 in which examples of the present disclosure can be implemented. System architecture 100 includes client 114 (e.g., a user machine) and Data Source Security Cluster (DSSC) 102. Client 114 and DSSC 102 are communicatively coupled via a network.

The network may be a public network (e.g., the Internet), a private network (e.g., a local area network (LAN) or wide area network (WAN)), or a combination thereof. In an example, a network may include the Internet and/or one or more intranets, landline networks, wireless networks, and/or other appropriate types of communication networks. In one example, a network may comprise a wireless telecommunications network (e.g., cellular phone network) adapted to communicate with other communication networks, such as the Internet.

Client 114 may be a computing device, such as a personal computer (PC), laptop, mobile phone, smart phone, smart television, tablet computer, or any other type of computing device. Client 114 may run an operating system (OS) that manages hardware and software of a respective machine. A browser may run on client 114 (e.g., on the OS). The browser may be a web browser that can access content and services provided by DSSC 102. Further, other types of software applications running on client 114 may provide access to content and services of DSSC 102 without the use of a browser.

In the present example, DSSC 102 includes a federation engine 104, a Helping Data Source (HDS) 108, a Data Data Source (DDS) A 110 and a DDS B 112. DDS A 110 and DDS B 112 store data that is needed by client 114. HDS 108 maps data from DDS A 110 to data from DDS B 112. There may be additional HDS and DDS data sources available in addition to those illustrated in the present example.

Each data source may include databases, files and/or web services. In one example, databases that may be used with the invention to store data include SQL, NOSQL, CASSANDRA, MYSQL, and POSTGRESQL databases. Each database may be any standard or proprietary database. Accordingly, each type of database may be managed by a database management system that corresponds to that database type. For example, a MYSQL database type may be managed by a MYSQL database management system, which is structured to receive and respond to queries of the MYSQL database.

In the present example, each data source is structured with a database that is a different database type than the databases at the other data sources. For example, HDS 108 may be a CASSANDRA database structured with one or more tables, DDS A 110 may be a MYSQL database structured with two or more tables, and DDS B 112 may be a POSTGRESQL database structured with two or more tables.

The structuring of each data source with a different database type offers the advantage of mitigating security risk. In the present example, a flaw in a first database type may not exist on the other database types, and therefore an attacker who is exploiting the flaw may be able to access only data on the first database, but not data on the second and third databases. Therefore, the scope of the data breach may be reduced, offering the advantage of more secure data. In some instances data from one database may be of little value without data from the other two databases.

In the present example, HDS 108 is structured to store data in a data table 126 to relate the data from a data table 120 of DDS A 110 and a data table 124 of DDS B 112. For example, data table 126 may store an identifier of a data element in data table 120 and an identifier of a data element in data table 124, which is used to match data elements in data table 120 to data elements in data table 124.

In the present example, in addition to data tables, DDS A 110 and DDS B 112 each are structured with secret tables 118 and 122, respectively, that store one or more security tokens necessary to access the DDS. Each security token is generated for a specific DDS such that a security token for one DDS is different from a security token for another DDS in the system (e.g., each security token is unique to a particular DDS). For example, DDS A 110 may be assigned a first security token and DDS B 112 may be assigned a second security token that is different than the first security token.

In the present example, each secret table may be structured as a table with a single column, with a single data element in the column that is the security token. Each new security token that is generated may replace the old security token in the secret table.

In another example, each secret table may store a plurality of security tokens, including both valid and expired security tokens.

In the present example, each security token may be a randomly generated number or string that includes any combination of letters, numbers and special characters. A security token may be valid until replaced by another security token. For example, a new token may be generated periodically, such as every ten seconds.

In the present example, each security token may be generated by token validator 106 and distributed to the appropriate DDS for storage in a secret table at that DDS (e.g., a security token for DDS A 110 may be sent to DDS A 110 for storage in secret table 118). In another example, a security token for DDS A 110 may be generated on DDS A 110 and stored in secret table 118. Similarly, a security token for DDS B 112 may be generated by token validator 106 or on DDS B 112 and stored in secret table 122.

In the present example, token validator 106 is located on federation engine 104. Token validator 106 is structured to validate each security token received from a client 114 to compare security tokens and determine whether a security token received from a client matches a security token of a particular DDS.

Federation engine 104 is a database management system and may be stored on a machine such as a rackmount server, a router computer, a personal computer, a portable digital assistant, a mobile phone, a laptop computer, a tablet computer, a camera, a video camera, a netbook, a desktop computer, a media center, or any combination thereof. In one example, federation engine 104 is TEIID, however, federation engine 104 may be any standard or proprietary database engine.

In the present example, HDS 108 is stored on the same machine as federation engine 104. DDS A 110 is stored on a separate machine from federation engine 104 that is communicatively coupled to federation engine 104. DDS B 112 is stored on a separate machine from federation engine 104 and DDS A 110, and is communicatively coupled to federation engine 104. In another example, data sources HDS 108, DDS A 110 and DDS B 112 may be stored on the same machine as federation engine 104 or on one or more separate machines. As explained above, each data source machine may be structured with a database management system that corresponds to the type of database that is used to store data (e.g., a MYSQL database management system may be executed on the DDS A 110 machine if DDS A 110 is structured with a MYSQL database, a POSTGRESQL database management system may be executed on the DDS B 112 machine if DDS B 112 is structured with a POSTGRESQL database, and so forth).

In an example, a client 114 may include applications associated with a service provided by DSSC 102 (e.g., applications, mobile applications, "apps"). In one example, one or more device types (e.g., smart phones, smart televisions, tablet computers, etc.) may use applications to access content provided by DSSC 102, to issue commands to DSSC 102, or to receive content from DSSC 102 without accessing or using web pages.

In the present example, client 114 is structured to store DDS identifiers 116 in a data structure (such as a table or linked list). In another example, the DDS identifiers 116 are stored in a flat file. In another example, federation engine 104 may be structured to store DDS identifiers 116, rather than storing DDS identifiers 116 on client 114.

In an example, functions performed by DSSC 102 also may be performed by the client 114, in whole or in part. In addition, the functionality attributed to a particular component may be performed by different or multiple components operating together. DSSC 102 also may be accessed as a service provided to other systems or devices via appropriate APIs, and thus is not limited to use in websites.

Figure 2:
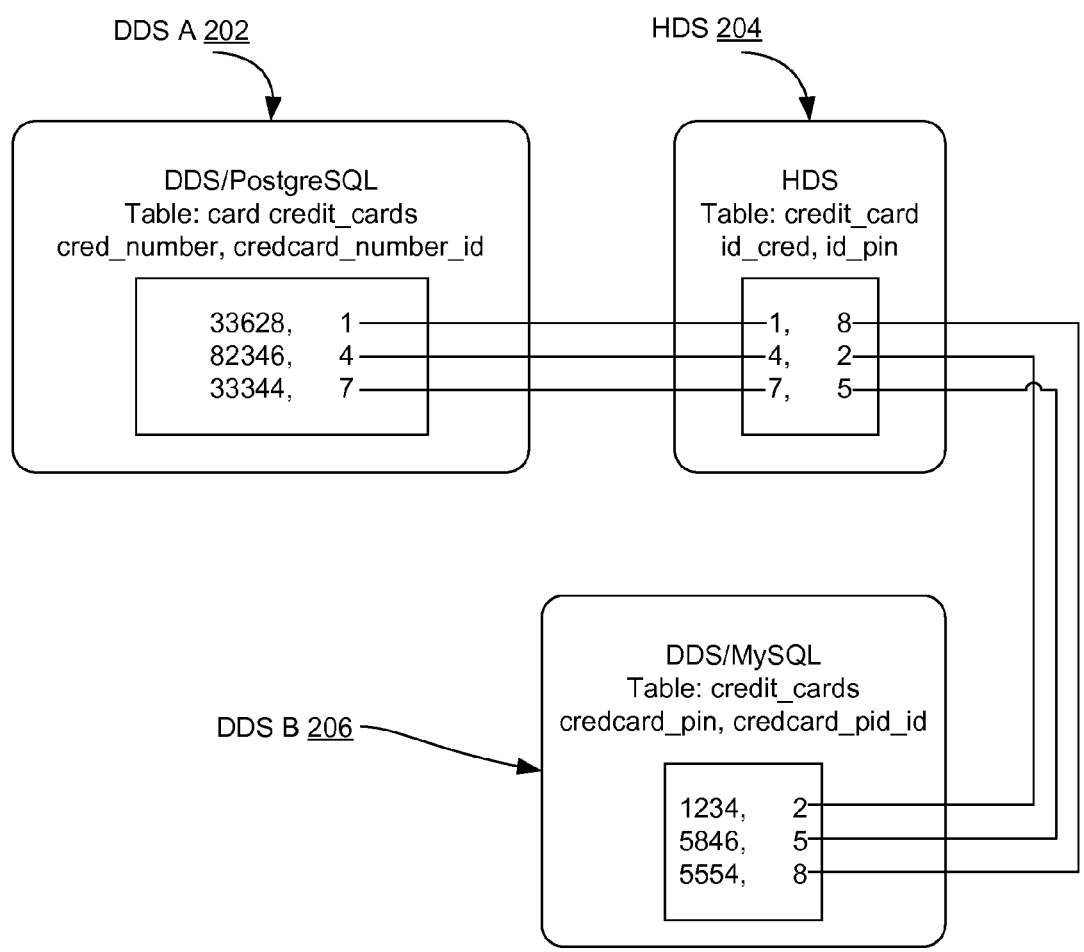
FIG. 2 is a block diagram illustrating a mapping relationship between data sources, according to an example of the present disclosure.

FIG. 2 is a block diagram illustrating a mapping relationship between data sources, according to an example of the present disclosure.

In the present example, DDS A 202 includes a POSTGRESQL database that is structured with a table containing stored credit card number data. In each row of the table the first column stores a credit card number and the second column stores the corresponding credit card number identifier.

DDS B 206 includes a MYSQL database that is structured with a table containing stored credit card pin data. In each row of the table the first column stores a credit card pin and the second column stores the corresponding pin identifier.

HDS 204 is structured with a mapping table that maps between a credit card identifier and a credit card pin identifier. In the present example, in each row of the table the first column stores the credit card identifier and the second column stores the corresponding pin identifier.

In the example tables, each credit card number in DDS A 202 is mapped to a corresponding pin in DDS B 206 using the mapping identifiers in HDS 204. For example, the credit card number 33628 has the credit card identifier 1, according to DDS A 202. Credit card identifier 1 is mapped to credit card pin identifier 8, according to HDS 204. Credit card pin identifier 8 is the identifier for credit card pin 5554, according to DDS 206. Therefore, using all three tables, credit card number 33628 is mapped to credit card pin 5554. The mapping of a first data element to a second data element by matching the data elements' identifiers may be referred to as a transitive mapping.

In the present example, a security breach of DDS A 202 would reveal only the credit card numbers, but not the credit card pins. Similarly, a breach of DDS B 206 would reveal only the credit card pins, but not the credit card numbers. Even if both DDS A 202 and DDS B 206 were breached, a client would not be able to identify which credit card corresponds to which pin. A breach of HDS 204 alone would not provide an attacker with either a credit card number or a credit card pin.

In the present example, a client requires access to all three tables 202, 204 and 206 in order to access both a credit card number and a pin corresponding to that credit card number.

Figure 3:
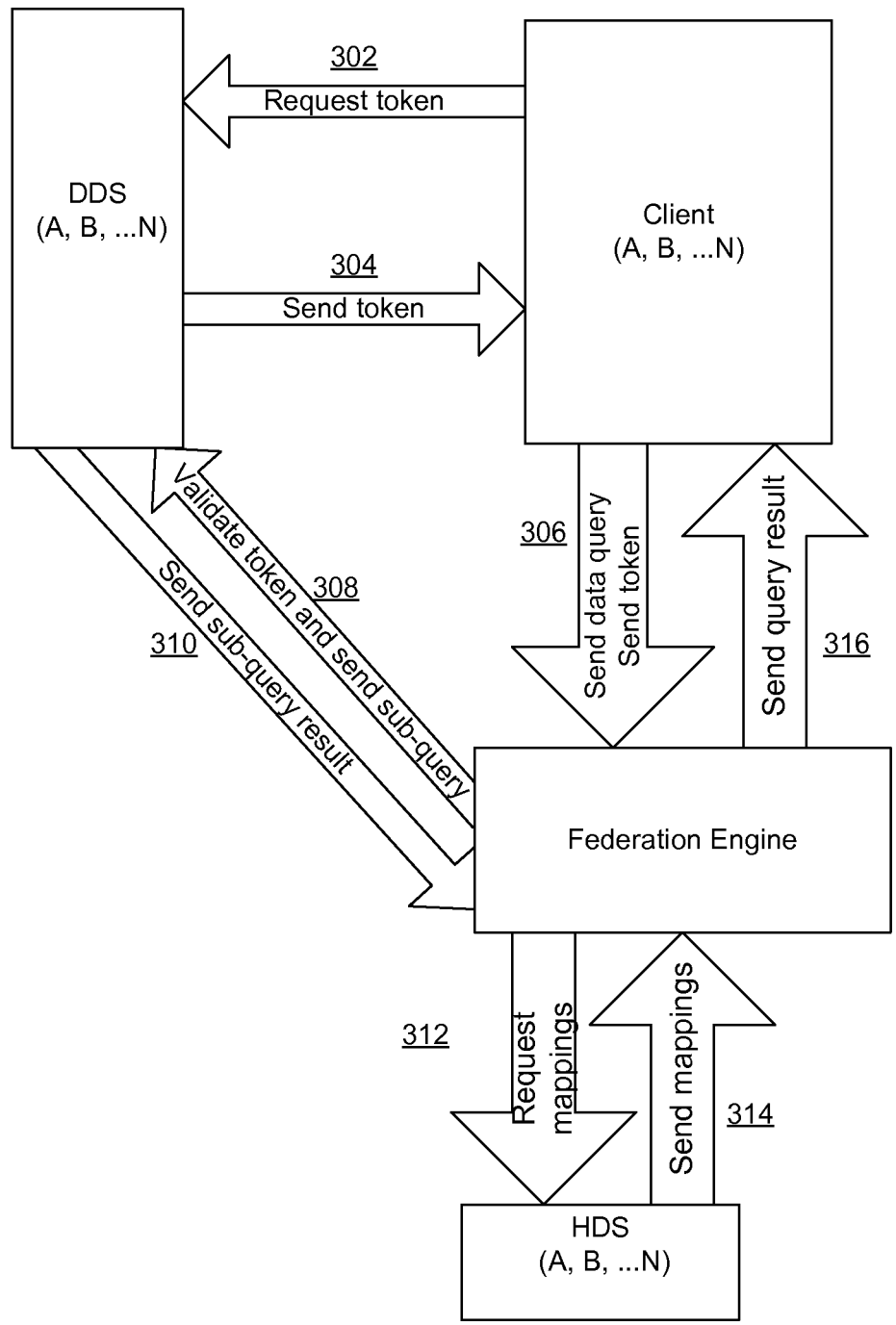
FIG. 3 is a flow diagram illustrating a secure data transaction, according to an example of the present disclosure.

FIG. 3 is a flow diagram illustrating a secure data transaction, according to an example of the present disclosure. The method 300 may be performed by processing logic that may comprise hardware (e.g., circuitry, dedicated logic, programmable logic, microcode), software (such as instructions run on a general purpose computer system, dedicated machine, or processing device), firmware, or a combination thereof.

At block 302, a client initiates a transaction (e.g., to store, update and/or retrieve data from a data source) by requesting a security token from each DDS that the client needs to access for the transaction.

In the present example, the client may access DDS identifiers from a data store on the client. In another example, the client may request DDS identifiers from the federation engine.

For example, as illustrated in FIG. 2, there may be a DDS A that stores credit card numbers and a DDS B that stored credit card pins. The client may be configured with the DDS identifiers for DDS A and DDS B. A query for a credit card number and pin requires both tables. Therefore, a security token may be requested from both DDS A and DDS B.

Each security token request that is sent to a DDS may include user credentials, which the DDS authenticates to verify that the user has access privileges to the DDS. Security credentials may include a usernames, passwords, security certificates, biometric data, and so forth.

At block 304, upon authenticating the client, DDS accesses a secret table associated with the DDS.

The DDS retrieves the security token from the secret table and sends the security token to the client.

In the present example, the client retrieves a security token from each DDS that the client needs to access for the transaction, according to the method as described in blocks 302 and 304.

At block 306, the client sends the data request and corresponding security tokens to the federation engine. The data request may be a query to search, store, update, retrieve, sort and/or perform some other operation on the data. This data request may include both a query as well as the security tokens. One example of how the request may include both a query and security tokens is an SQL request that uses a comment field, such as query hint, to include the text of the security tokens.

At block 308, the federation engine generates sub-queries from the query. In the present example, the sub-queries may be generated by analyzing and parsing the query.

In one example, the sub-queries may be generated by decomposing the query.

In the present example, each sub-query is matched to a DDS or HDS that stores the data for that sub-query. For example, as illustrated in FIG. 2, DDS A may store credit card numbers and DDS B may store credit card pins. The federation engine may store a data structure such as a table that matches data columns with data sources, such that the federation engine may determine that data from the credit card number column is to be retrieved from DDS A. Accordingly, in this example, a first sub-query for credit card numbers is prepared for DDS A, a second sub-query for credit card pins is prepared for DDS B, and a third sub-query for the mapping from credit card numbers to credit card pins is prepared for the HDS.

In the present example, the security token for each DDS is processed by a token validator on the federation engine. The token validator may request a security token from each DDS and match the security token to the security tokens received from the client. If each security token is a match, the federation engine may authorize the client to access each DDS. The federation engine sends each sub-query for the authorized client to the appropriate DDS that contains the data for that sub-query.

In another example, the token validator may match each received security token from the client to a sub-query, and forward both a security token and a sub-query to each DDS. The sub-query may include the security token as a comment, such as a query hint for an SQL query. In this example, each DDS is responsible for matching between the security token stored in its secret table and the security token sent from the federation engine to determine whether a result set for the sub-query should be returned to the federation engine.

At block 310, if the security token has been validated for the DDS, then the DDS processes the sub-query. The results of the sub-query are sent to the federation engine.

At block 312, the federation engine requests the mappings corresponding to each DDS sub-query, and at block 314, the HDS provides the mappings to federation engine.

The federation engine joins the results of each sub-query using the HDS mappings to map between each of the DDS sub-query results. Accordingly, the sub-query results may be joined into a single result set that contains the columns from each DDS, which may be referred to as a "virtual view."

At block 316, results for the data query are determined from the virtual view, and the query results are sent to the client.

Figure 4:
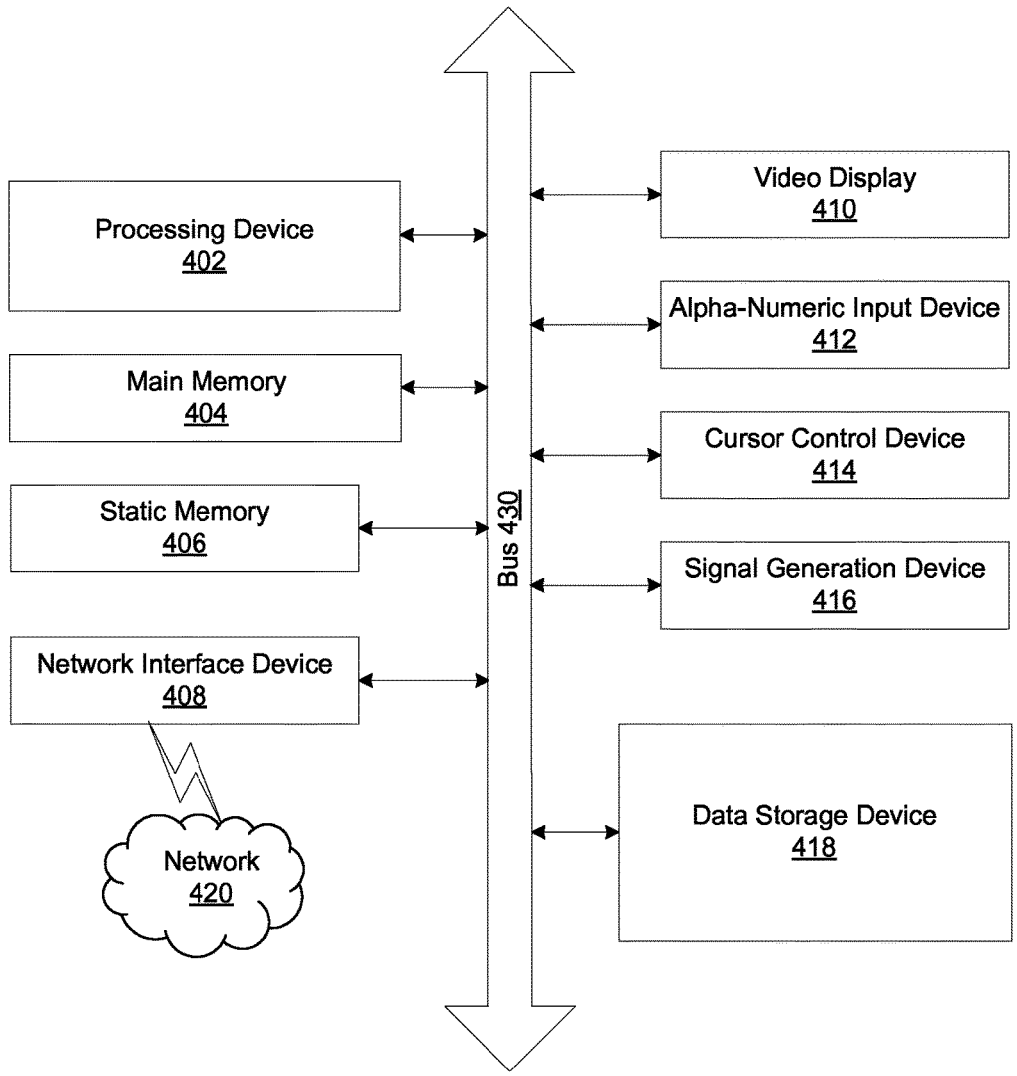
FIG. 4 is a flow diagram illustrating an exemplary computer system that may perform one or more of the operations described herein.

FIG. 4 illustrates a diagram of a machine in the exemplary form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Exemplary computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), etc.), static memory 406 (e.g., flash memory, static random access memory (SRAM), etc.), and data storage device 418, which communicate with each other via bus 430.

Processor 402 represents one or more general-purpose processing devices such as a microprocessor, central processing unit, or the like.

More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

In one example, the instructions are for enforcing separation of environments using cryptography (computing system 100 of FIG. 1) and/or a software library containing methods that call a system for enforcing separation of environments using cryptography. While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A data source security cluster system, comprising:
a federation engine structured with a non-transitory memory and a processor, the processor in communication with the non-transitory memory to:
generate a first data source security token and a second data source security token;
send the first data source security token to a first data source and the second data source security token to a second data source;
receive, from a client, a request comprising at least a query, a first security token and a second security token;
extract the query, the first security token and the second security token from the request;
query the first data source for the first data source security token and the second data source for the second data source security token;
determine a first match between the first data source security token and the first security token;
based upon the determining of the first match, authorizing the client to access the first data source;
generate a first sub-query based on the query; and
send the first sub-query to the first data source.

2. The data source security system of claim 1, the processor further to:
determine a second match between the second data source security token and the second security token;
based upon the determining of the second match, authorizing the client to access the second data source;
generate a second sub-query based on the query;
send the second sub-query to the second data source; and
join a first result set received from the first data source and a second result set received from the second data source.

3. The data source security system of claim 2, wherein the first result set comprises at least a first data element and a first data identifier, and
wherein the second result set comprises at least a second data element and a second data identifier;
the processor further to:
generate a third sub-query based on the query;
send the third sub-query to a helping data source to request a mapping;
receive the mapping from the helping data source, wherein the mapping comprises the first data identifier mapped to the second data identifier; and based on the mapping between the first data identifier and the second data identifier, map the first data element to the second data element.

4. The data source security system of claim 3, wherein the first sub-query is a query of a first type of database,
wherein the second sub-query is a query of a second type of database,
wherein the third sub-query is a query of a third type of database, and
wherein each of the first type of database, the second type of database, and the third type of database is a different type of database than the other two types of database.

5. The data source security system of claim 4, wherein each of the first type of database, the second type of database and the third type of database is a different database selected from the group consisting of: PostgreSQL, MySQL, Cassandra, and NoSQL.

6. The data source security system of claim 1, the processor further to:
at a periodic interval, randomly generate a new first data source security token and a new second data source security token; and
send the new first data source security token to the first data source and the new second data source security token to the second data source.

7. A computer-implemented method, comprising:
receiving an initial query, a first security token and a second security token;
generating at least a first sub-query and a second sub-query from the initial query;
matching the first sub-query to the first security token and the second sub-query to the second security token;
sending the first sub-query and the first security token to the first data source;
sending the second sub-query and the second security token to the second data source; and
receiving a first result set from the first data source and a second result set from the second data source.

8. The method of claim 7, wherein the first result set comprises at least a first data element and a first data identifier, and
wherein the second result set comprises at least a second data element and a second data identifier.

9. The method of claim 8, further comprising:
retrieving a mapping from a helping data source, wherein mapping maps the first data identifier to the second data identifier.

10. The method of claim 9, further comprising:
based on the mapping between the first data identifier and the second data identifier, mapping the first data element to the second data element.

11. The method of claim 7, further comprising:
at the first data source, matching the first security token to a first data source security token; and
at the second data source, matching the second security token to the second data source security token.

12. The method of claim 7, further comprising:
creating a virtual view comprising the first result set and the second result set.

13. The method of claim 12, further comprising:
determining one or more data elements from the virtual view corresponding to the initial query and outputting the one or more data elements.

14. A non-transitory computer-readable medium comprising computer-readable instructions which, when executed by a processor, cause the processor to perform operations comprising:
receiving a query, a first security token and a second security token;
generating at least a first sub-query and a second sub-query from the query;
mapping the first sub-query to the first security token;
mapping the second sub-query to the second security token;
sending the first sub-query to the first data source;
sending the second sub-query to the second data source;
receiving a first result set from the first data source;
receiving a second result set from the second data source; and
joining the first result set and the second result set to create a third result set.

15. The non-transitory computer-readable storage medium of claim 14, wherein the first result set comprises at least a first data element and a first data identifier.

16. The non-transitory computer-readable storage medium of claim 15, wherein the second result set comprises at least a second data element and a second data identifier.

17. The non-transitory computer-readable storage medium of claim 16, the processor further to perform operations comprising:
querying a helping data source for a mapping; and
receiving the mapping from the helping data source, wherein the mapping maps the first data identifier to the second data identifier.

18. The non-transitory computer-readable storage medium of claim 17, the processor further to perform operations comprising:
based on the mapping between the first data identifier and the second data identifier, mapping the first data element to the second data element.

19. The non-transitory computer-readable storage medium of claim 17, wherein the first sub-query sent to the first data source is a query of a first type of database,
wherein the second sub-query sent to the second data source is a query of a second type of database,
wherein the query sent to the helping data source is a query of a third type of database, and
wherein each of the first type of database, the second type of database, and the third type of database is a different type of database than the other two types of database.

20. The non-transitory computer-readable storage medium of claim 14, the processor further to perform operations comprising:
querying a first data source for a first data source security token, and querying a second data source for a second data source security token;
matching the first data source security token to the first security token;
matching the second data source security token to the second security token;
at a periodic interval, generating a new first data source security token and a new second data source security token; and
sending the new first data source security token to the first data source and the new second data source security token to the second data source.

* * * * *